R. H. McCAFFERTY

June 6, 1933. SECTION INSULATOR Re. 18,863

Original Filed March 24, 1931

WITNESSES.
E. A. McCloskey.
R. B. Chilcot

INVENTOR
Robert H. McCafferty.
BY
Wesley J. Baur
ATTORNEY

Reissued June 6, 1933 Re. 18,863

UNITED STATES PATENT OFFICE

ROBERT H. McCAFFERTY, OF WILMINGTON, DELAWARE, ASSIGNOR TO WESTINGHOUSE ELECTRIC & MANUFACTURING COMPANY, A CORPORATION OF PENNSYLVANIA

SECTION INSULATOR

Original No. 1,870,060, dated August 2, 1932, Serial No. 524,776, filed March 24, 1931. Application for reissue filed November 26, 1932. Serial No. 644,534.

My invention relates to section insulators and particularly to section insulators of the type utilized in connection with trolley conductors in overhead line construction for electric railways.

An object of my invention, generally stated, is to provide an improved section insulator which shall be simple and efficient in operation and which may be readily and economically manufactured.

A more specific object of my invention is to provide a renewable runner for a section insulator which shall have a long life and which shall not be affected by arcing between the trolley conductor and the current collector.

Another object of my invention is to provide a runner, having renewable arcing tips, for a section insulator.

Other objects of my invention will be explained fully hereinafter or will be apparent to those skilled in the art.

According to my invention, the underrunner of a section insulator is composed of rubber or other material having similar characteristics which is resilient and flexible and is not worn away rapidly by the trolley wheel of the current collector. The rubber runner is provided with metal arcing tips to prevent burning of the rubber by the arc drawn between the trolley wheel and the trolley conductor as the wheel passes from the current-conducting portion of the section insulator to the insulated portion. The metal arcing tips may be permanently molded into the rubber runner or may be removably attached to lugs which are molded into it.

For a fuller understanding of the nature and scope of my invention, reference may be had to the following detailed description, taken in conjunction with the accompanying drawing, in which.

Figure 1:
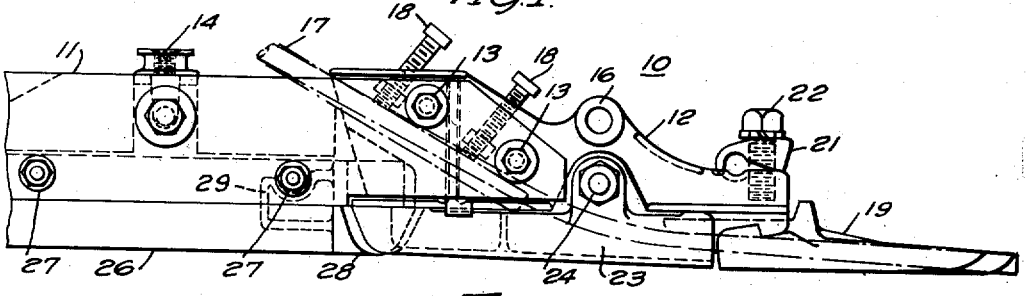
Figure 1 is a view, in side elevation, of a portion of a section insulator embodying my invention.

Referring to Fig. 1 of the drawing, 10 designates, generally, a section insulator having a body portion 11 composed of an insulating material, as, for example, treated wood. The usual metal end castings 12 are attached to the body portion 11 by means of bolts 13.

A suitable hanger 14 is attached to the body 11 at its central portion, as a means for supporting the insulator in an operative position in the overhead structure of a trolley system. Additional means for steadying and supporting the insulator are furnished by eyelets 16 in the metal end castings, to which supporting wires may be connected.

As shown, the end of a trolley wire 17 may be secured to the end casting 12 by means of two set screws 18. The trolley wire is further secured in position by a bayonet approach 19, one of which is provided at each end of the section insulator. The bayonet approaches may be of the type described in Patent No. 1,563,455, or of any other suitable type.

A clamp 21, which is secured to the end casting 12 by a bolt 22, is provided at each end of the section insulator 10. If it is desired to bridge the insulator, a jumper may be secured to the end castings 12 by means of the clamps 21 to electrically connect the two ends of the trolley conductor, thereby permitting current to flow past the insulator.

In order to provide a smooth surface for a current collector, a metal under-run 23 is provided at each end of the section insulator. The metal runners 23 have rounded under portions to form a smooth running surface for the current collecting device. The metal runners are attached to the end casting 12 by means of bolts 24 and may be readily replaced when they become worn.

Since the one end of the section insulator must be insulated from the other end, the metal runners 23 cannot be extended the entire length of the insulator. In the past, it has been customary to provide a wooden runner to extend through the central portion of the insulator.

However, the wooden runners soon become so badly worn that frequent replacements were necessary. I have found that a runner composed of rubber, or other material of a resilient and tough nature, resists the wear caused by the friction of the current collector and has an exceptionally long life. In the preferred embodiment of my invention, a rubber runner 26 is attached to the body portion 11 by two bolts 27 and may be readily replaced if it becomes necessary to do so.

Figure 2:
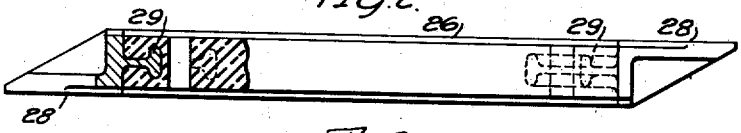
Fig. 2 is a top plan view of the renewable underrunner utilized in the section insulator, a portion being cut away for clearness.
Figure 3:
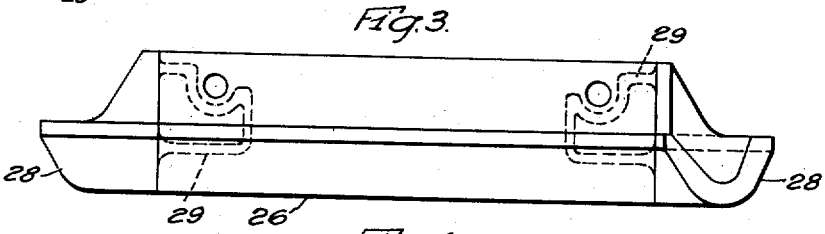
Fig. 3 is a view, in side elevation, of the runner shown in Fig. 2.

With a view to preventing the rubber runner from being burnt by the arc which is drawn between the metal runner 23 and the current collector, as it leaves the metal runner, a metal arcing tip 28 is provided at each end. The arc strikes the metal tip and, therefore, does not injure the rubber. The arcing tips may be molded into the rubber, as shown in Figs. 2 and 3, thereby greatly reducing the cost of manufacture. The rubber is molded about supporting lugs 29 which are provided on the arcing tips. In this manner, the tips 28 are rigidly secured to the runner 26.

Figure 4:
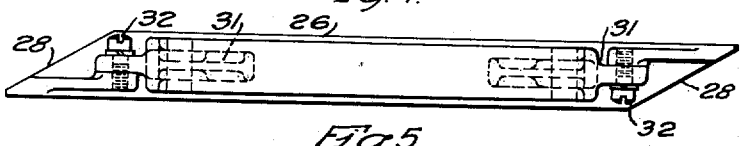
Fig. 4 is a top plan view of a runner having removable arcing tips.
Figure 5:
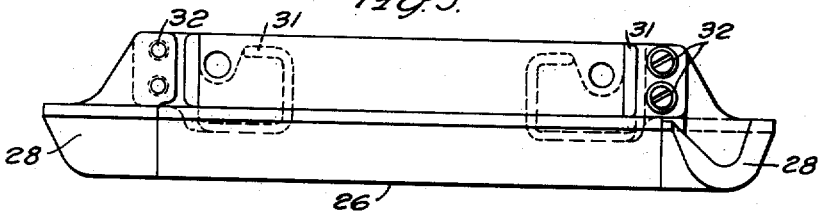
Fig. 5 is a view, in side elevation, of the runner shown in Fig. 4.
Figure 6:
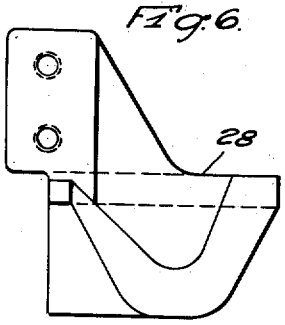
Fig. 6 is an enlarged view, in side elevation, of a removable arcing tip.

If it is so desired, the runner 26 may be provided with removable arcing tips 28, as shown in Figs. 4 and 5. The rubber is molded about supporting lugs 31 to which the arcing tips 28 are attached by means of screws 32. Since the tips may be readily removed, they may be replaced by new tips when they are burned by the arcs drawn by the current collector. In this manner, it is not necessary to replace the entire runner when the tips become burnt, thereby effecting a saving in the cost of maintenance of the section insulator.

It will be evident from the foregoing description that a section insulator which is provided with a rubber runner, constructed as above described, may be economically manufactured, will be efficient in operation, will have a low cost of maintenance and will have a long life.

Since numerous changes may be made in the above-described construction, and different embodiments of the invention may be made without departing from the spirit and scope thereof, it is intended that all matter contained in the above description or shown in the accompanying drawing shall be interpreted as illustrative and not in a limiting sense.

I claim as my invention:

1. In a section insulator for trolley conductors, in combination, an insulating body member, metal end members therefor, metal end runners removably attached to the end members, bayonet approach members attached to the end members for holding the trolley conductor, a rubber runner removably attached to the body member and disposed between the end runners in alinement therewith, and metal arcing tips molded into the rubber runner to prevent burning its ends.

2. In a section insulator for trolley conductors, in combination, an insulating body member, metal end members therefor, metal end runners removably attached to the end members, bayonet approach members attached to the end members for holding the trolley conductor, a rubber runner removably attached to the body member and disposed between the end runners, and metal arcing tips removably attached to lugs on the ends of the rubber runner whereby the arcing tips may be readily replaced.

3. In a section insulator for trolley conductors, in combination, an insulating body member, metal end members therefor, metal end runners removably attached to the end members, means for securing the trolley conductor in the end members, approach members removably attached to the end members for holding the trolley conductor in position, a rubber runner removably attached to the body member and disposed between the end runners in alinement therewith, said rubber runner being provided with metal arcing tips molded into the rubber to prevent burning its ends.

4. In a section insulator for trolley conductors, in combination, an insulating body member, metal end members therefor, metal end runners removably attached to the end members, means for securing the trolley conductor in the end members, approach members removably attached to the end members for holding the trolley conductor in position, a rubber runner removably attached to the body member and disposed between the end runners in alinement therewith, said rubber runner being provided with metal arcing tips removably attached to metal lugs molded into its ends to prevent the ends from burning.

5. A runner for a section insulator comprising a rectangular block of rubber adapted to be attached to the section insulator and having a rounded bottom surface, a metal arcing tip disposed at each end of the runner to prevent burning thereof, said rubber being molded about supporting lugs on the arcing tips to secure the tips in position.

6. A runner for a section insulator comprising a rectangular block of rubber adapted for attachment to the section insulator and having a rounded bottom surface, a metal arcing tip disposed at each end of the runner to prevent burning thereof, said arcing tips being removably attached to supporting lugs molded into the rubber.

7. A runner for a section insulator comprising a body portion having its bottom surface shaped to receive a current collector, said body portion being composed of a tough and resilient material, metallic arcing tips adapted to be secured to the ends of the body portion, and means molded into the ends of the body portion to secure the arcing tips thereto.

8. A runner for a section insulator comprising a block of rubber or similar resilient material and having a rounded bottom surface, an arcing tip disposed at each end of the runner to prevent burning thereof, said runner being formed about supporting lugs on the arcing tips to secure them in position.

9. A runner for a section insulator comprising, in combination, a body portion having its bottom surface shaped to receive a current collector and composed of tough and resilient material, metallic arcing tips adapted to be secured to the ends of the body portion, and means molded into the body portion to secure the arcing tips thereto.

10. A removable runner for a section insulator comprising, in combination, a rubberized body member having its bottom surface shaped to receive a current collector, metallic arcing tips adapted to be secured to the body member to prevent the burning thereof on passage of a current collector, and means molded into the body member for securing the arcing tips thereto.

11. A section insulator for trolley conductors comprising, in combination, an insulating body member, metal end members therefor, metal end runners removably attached to the end members, approach members attached to the end members for gripping the trolley conductors, a rubber runner removably disposed between the end runners and in alinement therewith, the bottom surfaces of said runners being shaped to receive a current collector, metal arcing tips spaced from the end runners and juxtaposed with the rubber runner to prevent burning thereof on passage of a current collector, and retaining means molded into the rubber runner for securing the arcing tips in operative relation.

12. In a section insulator for trolley conductors, in combination, an insulating body member, metal end members therefor provided with metal runners on the underside thereof, a rubber runner secured between the metal runners and in alinement therewith, the under surfaces of said runners being shaped to receive a current collector, metal arcing tips spaced from the metal runners and juxtaposed with the rubber runner to prevent burning thereof on passage of a current collector, and retaining means molded into the rubber runner for securing the arcing tips in operative relation.

In testimony whereof, I have hereunto subscribed my name this 15th day of November, 1932.

ROBERT H. McCAFFERTY.